Patented Nov. 22, 1949

2,489,091

UNITED STATES PATENT OFFICE 2,489,091

PRODUCTION OF ORGANIC PHOSPHORUS COMPOUNDS

Morris S. Kharasch, Chicago, Ill., assignor to United States Rubber Company, New York, N. Y., a corporation of New Jersey No Drawing. Application July 19, 1946, Serial No. 684,774

3 Claims. (Cl. 204—158)

This invention relates to a method of producing organic phosphorus compounds of the type $R \cdot P \cdot Hal_2$ where R is a halogen-aliphatic radical, P is phosphorus, and Hal represents halogen.

An object of the invention is to provide a novel method of making the aforesaid chemicals. A further object is to provide a method of making the aforesaid chemicals from aliphatic organic compounds having at least one carbon-to-carbon ethylenic unsaturation. Other objects will be apparent from the following description.

According to the invention, the unsaturated aliphatic compound is heated with phosphorus trichloride in the presence of a per-oxy compound catalyst or subjected to an agent having similar action, such as actinic light rays having a wave length below 3000 Angstrom units. The per-oxy compound may be a diacyl peroxide, such as diacetyl peroxide, or dibenzoyl peroxide, or other compound having directly linked oxygen atoms. The reaction is preferably carried out in the presence of molal excess of phosphorus trihalide, generally from 2–20 moles thereof for each mole of the unsaturated aliphatic compound.

In the case of the compound containing a terminal olefinic double bond, the reaction may be considered to be as follows:

(a) 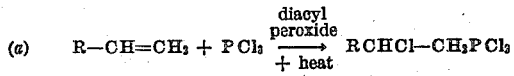

or (b) 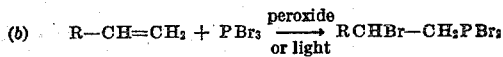

where R is an aliphatic hydrocarbon radical.

The unsaturated aliphatic compound which is reacted with the phosphorus trihalide, preferably has from 2 to 12 directly linked carbon atoms, for example, such as ethylene, propene, butene-1, isobutylene, pentene-1, hexene-1, heptene-1, octene-1, nonene-1, decene-1, undecene-1, and dodecene-1.

The primary reaction product may consist of one or more of the compounds of the type $R \cdot P \cdot Hal_2$.

On the basis of the formula $RCHClCH_2PCl_2$, the compound can be readily dehydrohalogenated to form compounds of the type $RCH=CHPCl_2$ which in turn can then be hydrogenated to give compounds of the type $RCH_2CH_2PCl_2$.

The reaction whereby the constituent atoms of phosphorus trichloride are added to unsaturated organic compounds to form compounds in which a phosphorus atom is attached to one carbon atom and two halogen atoms are attached to the phosphorus atom and the remaining halogen is attached to another carbon atom of the organic compound is assumed to proceed via a free-radical chain reaction initiated by the free radicals formed by the decomposition of the diacyl peroxide. The following outline of the reactions believed to be involved in this new synthesis of organic phosphorus containing compounds is presented in terms of the reactions involving $PCl_3$, a compound of the type $R—CH=CH_2$ as a representative of the unsaturated organic compounds operable in the process and acetyl peroxide as representing an acyl peroxide and is intended to be illustrative and not limiting:

(1) 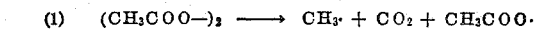
(2) 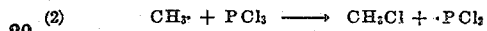
(3) 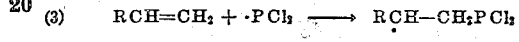

(4)

(5)
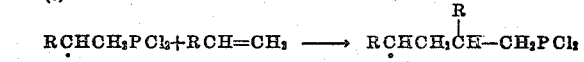

(6)
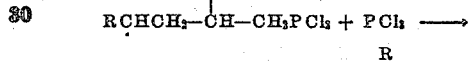
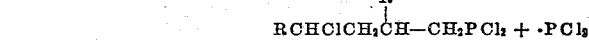

concurrently with the above, reactions of the following types are possible:

(7) 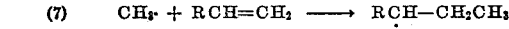
(8)
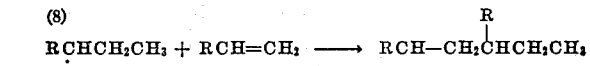

Reaction (2) may be regarded as the chain initiating step in which the free radical generated by the decomposition of a primary source of free radicals such as the diacyl peroxide interacts with the phosphorus trichloride to form a new free radical by the removal of a chlorine atom from a $PCl_3$ molecule. The free radical formed by this second reaction is then capable of adding to a molecule of the unsaturated organic compound as in (3) to form a third type of free radical which is itself capable as in (4) of reacting with a molecule of $PCl_3$ to remove a chlorine atom therefrom and to form at the same time a molecule of the compound $RCHClCH_2PCl_2$ and a free $PCl_2$ radical. The repetition of steps (3) and (4) constitutes the reaction chain which leads to the formation of products each molecule of which consists of the elements from one molecule of the unsaturated organic compound together with those from one molecule of phosphorus trichloride. Such compounds are for convenience referred to hereafter as one-to-one compounds. Concurrently with reactions (3) and (4) other reactions also of a free radical chain type such as those illustrated by (5) and (6) may take place. The formation of products containing in each molecule the elements from more than one molecule of the unsaturated organic compound is due to such reaction and similarly polymeric products may be formed by reactions such as (7) and (8). When reactions such as (5), (6), (7) or (8) predominate the yield of one-to-one products is undesirably reduced and I have found that such undesirable side reactions are minimized when the compounds containing the essential group $>C=CH_2$ are those having the type formula $R-CH=CH_2$ in which R is hydrogen or an aliphatic radical.

*Example*

A mixture containing 180 parts (1.6 moles) of octene-1 and 1374 parts (10 moles) phosphorus trichloride is placed in a two-necked dry flask equipped with a dropping funnel and a reflux condenser. The latter is connected to a tube, the other end of which dips below the surface of mercury contained in a suitable vessel. The air in the flask is displaced by nitrogen and the mixture is heated to 85° C. under a superatmospheric pressure corresponding to 20 cm. of mercury. 29.6 parts (0.25 mole) of diacetyl peroxide dissolved in 190 parts (1.7 moles) of octene-1 is added in four equal portions in the course of 2 hours. When all the peroxide is added the heating is continued for an additional 2 hours. The excess of phosphorus trichloride is removed from the reaction mixture at atmospheric pressure and the excess of octene-1 by distillation at reduced pressure. Fractional distillation at reduced pressure yields 130 parts of a colorless product B. P. 85–88° C./0.5 mm. which has the empirical formula $C_8H_{16}Cl_3P$ for which the probable structure is $C_6H_{13}CHClCH_2PCl_2$.

While certain temperatures and times have been indicated in the above example, it will be clear that time and temperature are co-related and may be widely varied. In general, the temperature range is from about 25° C. to about 150° C. Further, the amount of the product obtained will depend on the amount and nature of the catalyst employed.

Furthermore, better yields of the desired addition products are obtained if $PBr_3$ is used in place of $PCl_3$.

Having thus described my invention, what I claim and desire to protect by Letters Patent is:

1. Process of producing compounds of the formula $RPHal_2$ where R is a halogen-containing aliphatic radical, P is phosphorus, and Hal represents halogen, which comprises subjecting a reaction mixture containing an olefinic hydrocarbon and a molal excess of a phosphorus trihalide from the class consisting of phosphorus trichloride and phosphorus tribromide, to the action of a free radical reaction initiator.

2. Process of producing compounds of the formula $RPCl_2$ where R is a halogen-containing aliphatic radical, P is phosphorus, and Cl represents chlorine, which comprises subjecting a reaction mixture containing an olefinic hydrocarbon and from two to twenty moles of phosphorus trichloride for every mole of the olefinic hydrocarbon to the action of actinic light rays of a wavelength below 3000 Angstrom units.

3. Process of producing compounds of the formula $RPCl_2$ where R is a halogen-containing aliphatic radical, P is phosphorus, and Cl represents chlorine, which comprises heating a reaction mixture containing an olefinic hydrocarbon, from two to twenty moles of phosphorus trichloride for every mole of the olefinic compound and a peroxy polymerization catalyst to a temperature between 25° C. and 150° C.

MORRIS S. KHARASCH.

REFERENCES CITED

The following references are of record in the file of this patent:

UNITED STATES PATENTS

| Number | Name | Date |
|---|---|---|
| 2,262,813 | Morway et al. | Nov. 18, 1941 |

OTHER REFERENCES

Kharasch et al., J. A. C. S., vol. 67 (1945), pp. 1864–65.